United States Patent
Tamaru (10) Patent No.: US 7,245,409 B2
(45) Date of Patent: Jul. 17, 2007

(54) SCANNER APPARATUS AND IMAGE FORMING APPARATUS

(75) Inventor: Yasuo Tamaru, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/312,495

(22) Filed: Dec. 21, 2005

(65) Prior Publication Data

US 2006/0139716 A1 Jun. 29, 2006

(30) Foreign Application Priority Data

Dec. 24, 2004 (JP) .............................. 2004-374376

(51) Int. Cl.
G02B 26/08 (2006.01)

(52) U.S. Cl. ...................... 359/204; 359/216

(58) Field of Classification Search .............. 359/204, 359/205, 206, 215; 356/223, 256, 258
See application file for complete search history.

(56) References Cited

U.S. PATENT DOCUMENTS

| 6,307,584 B1 | 10/2001 | Hirst et al. |
| 6,317,244 B1 | 11/2001 | Ishibe |
| 2003/0112486 A1* | 6/2003 | Kudo .......................... 359/216 |
| 2004/0141219 A1 | 7/2004 | Ono et al. |

FOREIGN PATENT DOCUMENTS

| JP | 8 94951 | 4/1996 |
| JP | 9 127443 | 5/1997 |
| JP | 2000 235154 | 8/2000 |
| JP | 2001 113752 | 4/2001 |
| JP | 2002 82299 | 3/2002 |
| JP | 2003 121775 | 4/2003 |
| JP | 2003 233026 | 8/2003 |
| JP | 2003 279875 | 10/2003 |
| JP | 2004 21173 | 1/2004 |
| JP | 2004 58492 | 2/2004 |
| JP | 2004 98299 | 4/2004 |

* cited by examiner

Primary Examiner—Euncha P. Cherry
(74) Attorney, Agent, or Firm—Baker Botts L.L.P.

(57) ABSTRACT

A polygon mirror is placed so that its rotation axis is positioned on a center line in a main scanning direction of an image forming area scanned by each light beam. Moreover, two light beam irradiating optical units are placed so that the light beams are incident on reflective surfaces of the polygon mirror from directions that cross the line and are point symmetrical to each other with respect to the rotation axis of the polygon mirror. Further, two fθ lenses are placed so that their lens center positions are displaced in mutually opposite directions from the center line in the main scanning direction of the image forming area.

18 Claims, 5 Drawing Sheets

SCANNER APPARATUS AND IMAGE FORMING APPARATUS

CROSS-REFERENCE TO RELATED APPLICATION

This non-provisional application claims priority under 35 U.S.C. §119(a) on Patent Application No. 2004-374376 filed in Japan on Dec. 24, 2004, the entire contents of which are hereby incorporated by reference.

BACKGROUND

The present invention relates to an image forming apparatus, such as a laser printer, and a scanner apparatus incorporated in the image forming apparatus.

As electrophotographic type color laser printers, a tandem type color laser printer incorporating four photoconductor drums corresponding to yellow, magenta, cyan and black, respectively, has been known. In the tandem type color laser printer, toner images in the respective colors are formed substantially simultaneously on the respective photoconductor drums, and the toner images in the respective colors are transferred from these photoconductor drums to paper passing through the photoconductor drums one after the other so that the toner images are superimposed one upon the other. Therefore, a color image can be formed at substantially the same speed as in a monochrome laser printer.

In such a tandem type color laser printer, for example, a scanner employing a structure in which a plurality of light beams are deflected and scanned by a single polygon mirror may be incorporated as a scanner apparatus for forming an electrostatic latent image on each photoconductor drum.

Among scanner apparatuses of this type, there is a scanner apparatus that causes a plurality of light beams to be incident on different reflective surfaces of the polygon mirror from the same direction. There is also proposed a scanner apparatus that causes a plurality of light beams to be incident on different reflective surfaces of the polygon mirror (reflective surfaces on mutually opposite sides with respect to the rotation axis) from directions that are point symmetrical to each other with respect to the rotation axis of the polygon mirror (see, for example, Japanese Patent Application Laid-Open No. 2003-121775).

SUMMARY

However, in the structure in which a plurality of light beams are incident on the polygon mirror from the same direction, if the number of the reflective surfaces of the polygon mirror is not four, the incident timings of the light beams on the respective reflective surfaces deviate. This deviation causes a scan deviation in a sub-scanning direction of the respective light beams, and consequently causes a superimposition deviation in the sub-scanning direction of the toner images in the respective colors formed on paper. Moreover, even when the number of the reflective surfaces of the polygon mirror is four, if the rotation speed of the polygon mirror is increased to achieve the same print speed as in the case where a polygon mirror having six reflective surfaces is employed, it becomes difficult to control the incident timings of light beams on the respective reflective surfaces, and consequently a scan deviation in the sub-scanning direction of the light beams is caused.

On the other hand, in the structure disclosed in Japanese Patent Application Laid-Open No. 2003-121775, a plurality of light beams are incident from directions that cross the polygon mirror and are point symmetrical to each other with respect to the rotation axis of the polygon mirror. Therefore, this structure does not suffer from a trouble appearing in the structure where a plurality of light beams are incident on the polygon mirror from the same direction. However, since two fθ lenses through which the light beams deflected and scanned by the polygon mirror pass are disposed so that the rotation axis of the polygon mirror is positioned on a line running through the lens center of the lenses, the light beams will pass through the edge of the fθ lenses where the optical characteristic is poor, and consequently the electrostatic latent images formed on the respective photoconductor drums (images to be formed on paper) will have low quality.

It is therefore an object to provide a scanner apparatus capable of avoiding a scan deviation in a sub-scanning direction of light beams when scanning a plurality of light beams by a single polygon mirror, and also capable of forming high-quality electrostatic latent images on the respective photoconductors incorporated in an image forming apparatus.

It is another object to provide an image forming apparatus capable of forming a high-quality image.

In order to achieve the above object, a scanner apparatus according to a first aspect is a scanner apparatus for scanning an image forming area with a light beam, and characterized by comprising: a polygon mirror with a plurality of reflective surfaces for directing a light beam reflected thereby to the image forming area, and scanning the light beam in a scannable area wider than the image forming area in a main scanning direction by rotating on its rotation axis; a plurality of light beam emitting units for emitting light beams to the reflective surfaces from directions that cross a center line in the main scanning direction of the image forming area and are point symmetrical to each other with respect to the rotation axis of the polygon mirror; and a plurality of fθ lenses for scanning the light beams at equal speed in the image forming area, the fθ lenses being disposed so that their lens center positions through which the light beams directed to a center position in the main scanning direction of the scannable area pass are displaced in mutually opposite directions from the center line in the main scanning direction of the image forming area, wherein the image forming area is set so that the center line in the main scanning direction of the image forming area passes through the rotation axis of the polygon mirror.

According to such a structure, the light beams from a plurality of light beam emitting units are incident on the reflective surfaces of the polygon mirror from directions that cross the center line in the main scanning direction of the image forming area scanned by the light beams and are point symmetrical to each other with respect to the rotation axis of the polygon mirror. Therefore, even when the number of the reflective surfaces of the polygon mirror is not four, it is possible to avoid a scan deviation in the sub-scanning direction of the light beams. Moreover, since a plurality of fθ lenses are disposed so that their lens center positions are displaced in mutually opposite directions from the center line in the main scanning direction of the image forming area, it is possible to cause each light beam scanned by the polygon mirror to pass through the vicinity of the lens center of each fθ lens. It is thus possible to form high-quality electrostatic latent images on the respective photoconductors incorporated in an image forming apparatus.

An image forming apparatus according to a second aspect is characterized by comprising: a plurality of photoconductors; and a scanner apparatus for scanning an image forming area with a light beam, wherein the scanner apparatus comprises: a polygon mirror with a plurality of reflective surfaces for directing a light beam reflected thereby to the image forming area, and scanning the light beam in a scannable area wider than the image forming area in a main scanning direction by rotating on its rotation axis; a plurality of light beam emitting units for emitting light beams to the reflective surfaces from directions that cross a center line in the main scanning direction of the image forming area and are point symmetrical to each other with respect to the rotation axis of the polygon mirror; and a plurality of fθ lenses for scanning the light beams at equal speed in the image forming area, the fθ lenses being disposed so that their lens center positions through which the light beams directed to a center position in the main scanning direction of the scannable area pass are displaced in mutually opposite directions from the center line in the main scanning direction of the image forming area, and wherein the image forming area is set so that the center line in the main scanning direction of the image forming area passes through the rotation axis of the polygon mirror.

According to such a structure, the light beams from a plurality of light beam emitting units are incident on the reflective surfaces of the polygon mirror from directions that cross the center line in the main scanning direction of the image forming area scanned by the light beams and are point symmetrical to each other with respect to the rotation axis of the polygon mirror. Therefore, even when the number of the reflective surfaces of the polygon mirror is not four, it is possible to avoid a scan deviation in the sub-scanning direction of the light beams. Moreover, since a plurality of fθ lenses are disposed so that their lens center positions are displaced in mutually opposite directions from the center line in the main scanning direction of the image forming area, it is possible to cause each light beam scanned by the polygon mirror to pass through the vicinity of the lens center of each fθ lens. It is thus possible to form high-quality electrostatic latent images on the respective photoconductors. As a result, it is possible to form a high-quality image.

The above and further objects and features will more fully be apparent from the following detailed description with accompanying drawings.

DETAILED DESCRIPTION OF THE EXEMPLARY EMBODIMENTS

<Overall Structure of Color Laser Printer>

Figure 1:
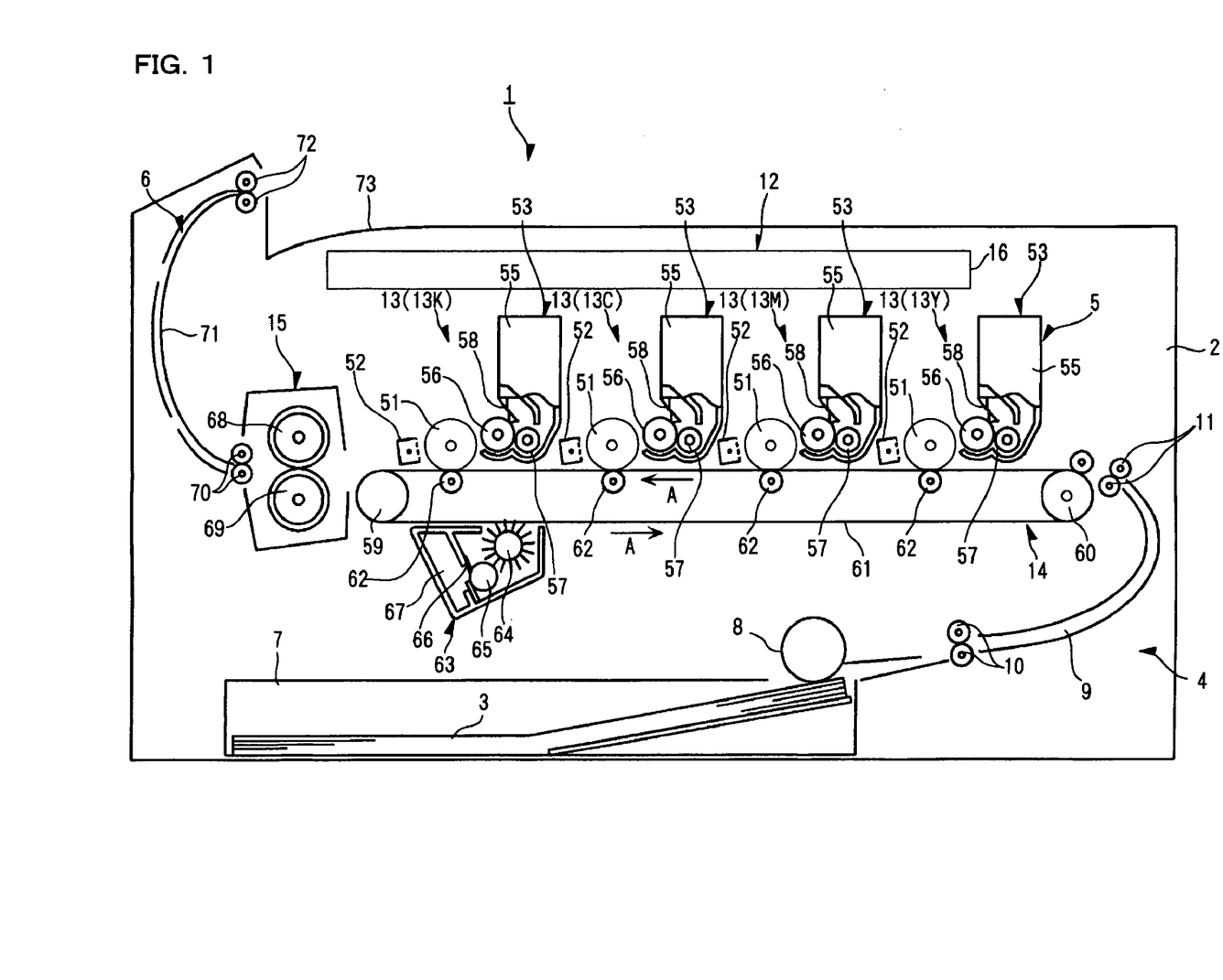
FIG. 1 is a sectional side view showing one embodiment of a color laser printer as an image forming apparatus (a view of a vertical section seen from a side when the laser printer is cut along a front-to-rear direction)

FIG. 1 is a sectional side view showing one embodiment of a color laser printer as an image forming apparatus.

The color laser printer 1 is a transverse-mount-type tandem color laser printer in which a plurality of processing units 13 are aligned in a horizontal direction, and comprises, in a box-shaped main casing 2, a paper feed unit 4 for feeding paper 3, an image forming unit 5 for forming an image on the fed paper 3, and a paper discharge unit 6 for discharging the paper 3 carrying the image formed thereon.

<Structure of Paper Feed Unit>

The paper feed unit 4 comprises a paper cassette 7 placed in the bottom of the main casing 2, a paper feed roller 8 disposed on the upper front side of the paper cassette 7 (in the following explanation, the right side and the left side in FIG. 1 will be referred to as the front side and the rear side, respectively), a paper feed path 9 provided on the upper front side of the paper feed roller 8, a pair of transport rollers 10 disposed in the course of the paper feed path 9, and a pair of resist rollers 11 disposed at the downstream end of the paper feed path 9.

In the paper cassette 7, paper 3 is stacked, and the top most sheet of the paper 3 is fed to the paper feed path 9 with a rotation of the paper feed roller 8.

The paper feed path 9 is formed as a substantially U-shaped transport path for paper 3 so that the upstream end is located adjacent to the paper feed roller 8 on the lower side to feed the paper 3 toward the front side, and that the downstream end is located adjacent to a later-described transfer belt 61 on the upper side to discharge the paper 3 toward the rear side.

Thus, the paper 3 fed to the paper feed path 9 is transported by the transport rollers 10 in the paper feed path 9. After the transport direction of the paper 3 is reversed, the paper 3 is resisted by the resist rollers 11 and then fed toward the rear side by the resist rollers 11.

<Structure of Image Forming Unit>

The image forming unit 5 comprises a scanner unit 12 as a scanner apparatus, processing units 13, a transfer unit 14, and a fixing unit 15.

<Structure of Scanner Unit>

Figure 2:
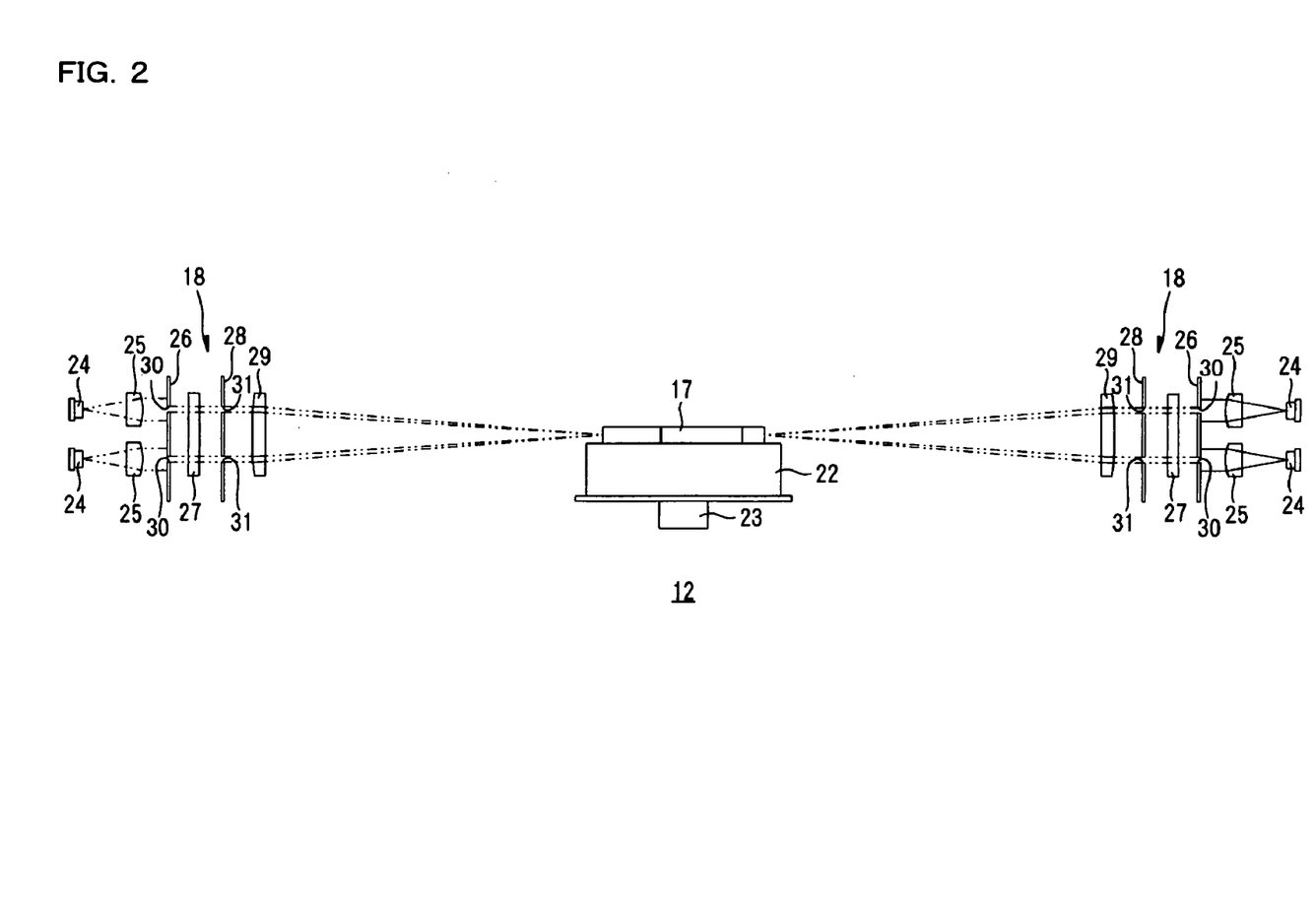
FIG. 2 is a side view showing the optical system of a light beam irradiating optical unit in a scanner unit of the color laser printer shown in FIG. 1.
Figure 5:
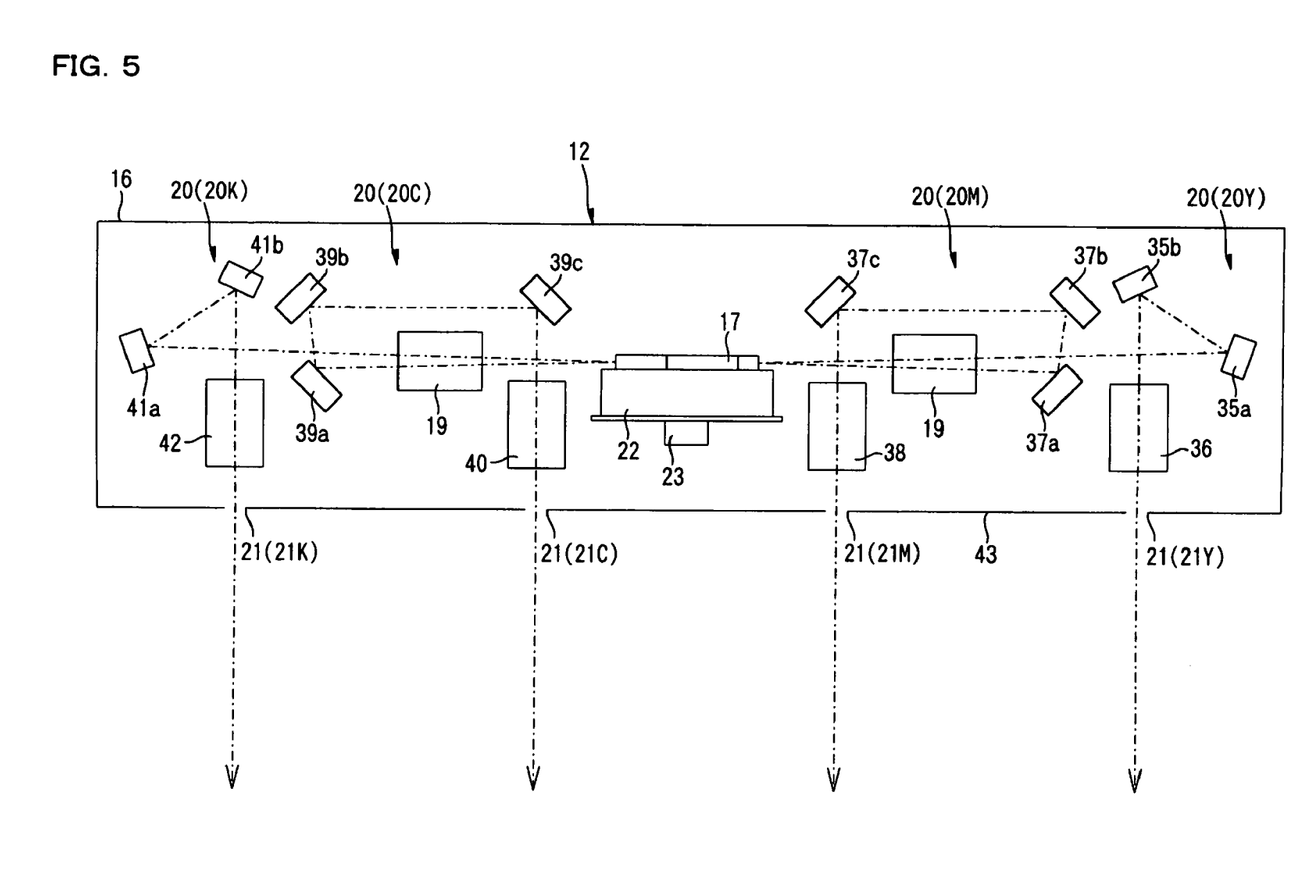
FIG. 5 is a side view showing the optical system of a light beam emitting optical unit in the scanner unit of the color laser printer shown in FIG. 1.

The scanner unit 12 is disposed over a plurality of later-described processing units 13 in the upper part of the main casing 2. FIG. 2 is a side view of an essential structure of the scanner unit 12 seen from a side, and FIG. 5 is a sectional side view of the scanner unit 12 seen from a side. As shown in FIGS. 2 and 5, the scanner unit 12 comprises a scanner casing 16, a polygon mirror 17 mounted in the scanner casing 16, light beam irradiating optical units 18 for irradiating light beams on the polygon mirror 17, fθ lenses 19 for converting the light beams deflected and scanned by the polygon mirrors 17 into parallel light beams of equal speed, and light beam emitting optical units 20 for emitting the light beams passed through the fθ lenses 19 as light beams corresponding to respective colors.

As shown in FIG. 5, the scanner casing 16 is in the shape of a box, and has emission widows 21 corresponding to the respective colors in the bottom wall 43 thereof. The emission windows 21 are formed at different positions in the front-to-rear direction with a space therebetween so that they are formed as a yellow emission window 21Y, a magenta emission window 21M, a cyan emission window 21C and a black emission window 21K corresponding to the respective colors in this order from the front to the rear side.

Figure 3:
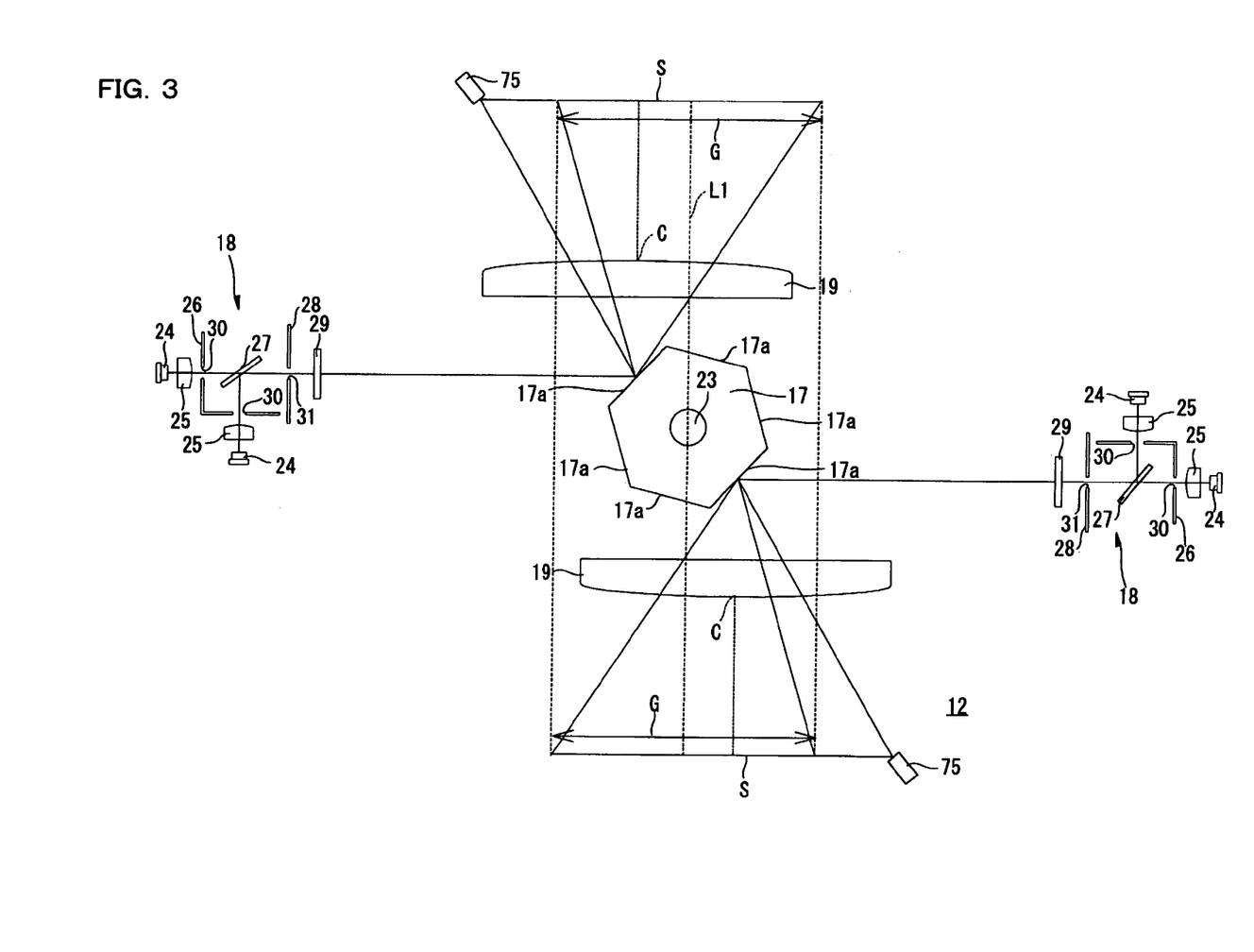
FIG. 3 is a plan view showing the optical system of the light beam irradiating optical unit in the scanner unit of the color laser printer shown in FIG. 1.

One polygon mirror 17 is provided for later-described four light beam emitting units 24 on a motor substrate 22 at the middle in the front-to-rear direction in the scanner casing 16. FIG. 3 is a plan view of the essential structure of the scanner unit 12 seen from the above. As shown in FIG. 3, the polygon mirror 17 is formed as a polyhedron (for example, a hexahedron) having a plurality of reflective surfaces 17a, and is rotated on a rotation axis 23 located at the center thereof at high speed by the power of the scanner motor contained in the motor substrate 22.

The light beam irradiating optical units 18 are disposed symmetrically with respect to the polygon mirror 17. Each of the light beam irradiating optical units 18 comprises light beam emitting units 24, collimator lenses 25, a first slit plate 26, a reflective mirror 27, a second slit plate 28 and a cylindrical lens 29 as one set.

The light beam emitting units 24 include semiconductor lasers, and two light beam emitting units 24 are provided in each of the light beam irradiating optical units 18. The light beam emitting units 24 are positioned so that the optical axes of light beams emitted from the respective light beam emitting units 24 cross each other at a right angle. As shown in FIG. 2, the light beam emitting units 24 are positioned with a space therebetween in a sub-scanning direction Y (see FIG. 4).

Figure 4:
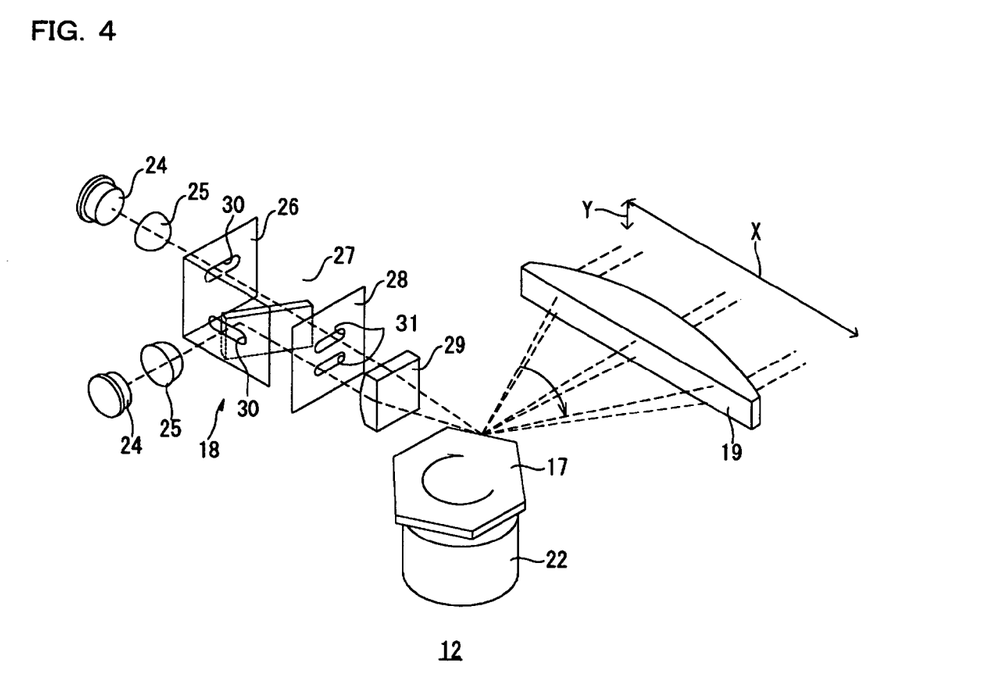
FIG. 4 is a perspective view showing the optical system of the light beam irradiating optical unit in the scanner unit of the color laser printer shown in FIG. 1.

FIG. 4 is a perspective view of the light beam irradiating optical unit 18 of the scanner unit 12 seen obliquely from the front side. As shown in FIG. 4, two collimator lenses 25 are provided for the light beam emitting units 24, respectively. Each of the collimator lenses 25 is positioned on the downstream side of each light beam emitting unit 24 to face the light beam emitting unit 24 in a passing direction of the light beam emitted from the light beam emitting unit 24 (hereinafter simply referred to as the light beam passing direction).

The light beams emitted from the light beam emitting units 24 are converted by the respective collimator lenses 25 into parallel light beams to a main scanning direction X (see FIG. 4) and the sub-scanning direction Y (see FIG. 4).

As shown in FIG. 3, the first slit plate 26 is made of a substantially L-shaped plate composed of two flat plates connected together at a substantially right angle, and, as shown in FIG. 4, a first slit 30 is open in each of the flat plates. Each of the first slits 30 is formed in the shape of a long hole extending in the main scanning direction X (see FIG. 4), and arranged corresponding to each of the light beam emitting units 24 with a space therebetween. Further, in the first slit plate 26, each of the first slits 30 is positioned on the downstream side of each of the collimator lenses 25 in the light beam passing direction to face the collimator lens 25.

Each light beam that has passed through each of the collimator lenses 25 is restricted in the profile shape orthogonal to the light beam passing direction by each first slit 30 of the first slit plate 26, thereby preventing stray light of the light beam emitted from each light beam emitting unit 24.

The reflective mirror 27 is disposed on the downstream side of the respective first slits 30 in the light beam passing direction, and inclined at substantially 45° with respect to the respective flat plates of the substantially L-shaped first slit plate 26. The reflective mirror 27 is formed so that the light beam passed through one of the slits 30 passes linearly as it is on the upper side, while the light beam passed through the other slit 30 is reflected at substantially 90° and deflected at a substantially right angle on the lower side. Consequently, the optical paths of the two light beams emitted in the directions crossing each other at a right angle from the two light beam emitting units 24 are combined together in the main scanning direction X (see FIG. 4).

The second slit plate 28 is disposed on the downstream side of the reflective mirror 27 in the light beam passing direction. The second slit plate 28 is composed of a substantially rectangular flat plate, and second slits 31 are open corresponding to the respective light beam emitting units 24. The second slits 31 are formed in the shape of a long hole extending in the main scanning direction X (see FIG. 4), and aligned with a space therebetween corresponding to the respective light beam emitting units 24 in the sub-scanning direction Y (see FIG. 4).

The respective light beams passed through or reflected by the reflective mirror 27 pass through the second slits 31 of the second slit plates 28 and travel parallel to each other in the sub-scanning direction Y.

A cylindrical lens 29 is a resin lens formed by injection molding using a resin material, and disposed to face the second slit plate 28 with a predetermined distance therebetween at a position on the downstream side of the second slit plate 28 and the upstream side of the polygon mirror 17 in the light beam passing direction. The cylindrical lens 29 has refractive power only in the sub-scanning direction Y.

As shown in FIG. 2, the light beams passed through the second slits 31 of the second slit plate 28 are refracted by the cylindrical lens 29 to converge in the sub-scanning direction Y (see FIG. 4), and then incident on the polygon mirror 17.

Further, as shown in FIG. 3, the two light beam irradiating optical units 18 are disposed on mutually opposite sides to be symmetrical with respect to the polygon mirror 17, and two light beams passed through the cylindrical lenses 29 of the respective light beam irradiating optical units 18 are incident on the polygon mirror 17 from the mutually opposite sides. Thus, four light beams, that is, two sets of light beams (one set includes two light beams), are incident on the polygon mirror 17 from mutually opposite sides.

The polygon mirror 17 deflects the two sets of light beams (four light beams) incident from mutually opposite sides by high speed rotation, and scans the light beams in the main scanning direction X (see FIG. 4). Moreover, since the two light beams of each set are incident on the reflective surface of the polygon mirror 17 at mutually different angles, they are reflected from the reflective surface 17a at angles so that they are gradually separated form each other in the sub-scanning direction Y (top-to-bottom direction).

More specifically, as shown in FIG. 3, the polygon mirror 17 can scan the respective light beams within the range of scannable area S that is wider than an image forming area G in the main scanning direction on the surface of later-described each photoconductor drum 51. The polygon mirror 17 is disposed so that its rotation axis 23 is positioned on a center line L1 in the main scanning direction X (see FIG. 4) of the image forming area G scanned by each set of light beams. Further, the positional relation between the polygon mirror 17 and two light beam irradiating optical units 18 is determined so that the respective sets of light beams are incident on the reflective surfaces 17a of the polygon mirror 17 from directions that cross the center line L1 in the main scanning direction X of the image forming area G and are point symmetrical to each other with respect to the rotation axis 23 of the polygon mirror 17.

Two fθ lenses 19 are provided for the two sets of light beams so that they face each other with the polygon mirror 17 therebetween in a direction orthogonal to a direction in which each set of light beams are incident on the polygon mirror 17. More specifically, each of the fθ lenses 19 has a symmetrical shape with respect to a lens center position C through which the light beam directed to the center position in the main scanning direction X (see FIG. 4) of the scannable area S passes, and has a width (the width in the main scanning direction X) printable on A3 size paper. In other words, each of the fθ lenses 19 is a symmetrical lens for A3 and capable of providing a fθ function in an area corresponding to the width of A3 size paper, and the two fθ lenses 19 are disposed so that their lens center positions C are displaced in mutually opposite directions from the center line L1 in the main scanning direction X of the image forming area G corresponding to the width of A4 size paper. Besides, each of the fθ lenses 19 is arranged so that the lens center position C faces the center position in the main scanning direction X of the scannable area S in a direction parallel to the center line L1 in the main scanning direction X of the image forming area G.

Each of the fθ lenses 19 converts two light beams incident on the polygon mirror 17 from the respective light beam irradiating optical units 18 and scanned in the main scanning direction X by the polygon mirror 17 into parallel light beams of equal speed.

As shown in FIG. 5, a light beam emitting optical unit 20 is provided for each color. In other words, the light beam emitting optical unit 20 includes four yellow optical unit 20Y, magenta optical unit 20M, cyan optical unit 20C, and black optical unit 20K corresponding to the respective colors.

The yellow optical unit 20Y is disposed in the front most position in the front-to-rear direction, and comprises two reflective mirrors 35a and 35b for reflecting the light beam passed through the upper part of one of the fθ lenses 19, and a toroidal lens 36 for converging the light beam reflected by the reflective mirrors 35a and 35b in the sub-scanning direction Y (see FIG. 4).

The light beam passed through the upper part of the one fθ lens 19 is first reflected obliquely in an upper rear direction by the reflective mirror 35a in the yellow optical unit 20Y, and then reflected vertically downward by the reflective mirror 35b. Thereafter, the light beam vertically passes through the toroidal lens 36, and is then emitted from a yellow emission window 21Y.

The magenta optical unit 20M is disposed between the polygon mirror 17 and the yellow optical unit 20Y, and comprises three reflective mirrors 37a, 37b and 37c for reflecting the light beam passed through the lower part of the one fθ lens 19, and a toroidal lens 38 for converging the light beam reflected by the reflective mirrors 37a, 37b and 37c in the sub-scanning direction Y (see FIG. 4).

The light beam passed through the lower part of the one fθ lens 19 is first reflected upward by the reflective mirror 37a in the magenta optical unit 20M, and then reflected to the rear side by the reflective mirror 37b. Thereafter, the light beam is reflected vertically downward by the reflective mirror 37c, passes vertically through the toroidal lens 38, and is then emitted from a magenta emission window 21M.

The cyan optical unit 20C is disposed between the polygon mirror 17 and the black optical unit 20K, and comprises three reflective mirrors 39a, 39b and 39c for reflecting the light beam passed through the lower part of the other lens fθ 19, and a toroidal lens 40 for converging the light beam reflected by the reflective mirrors 39a, 39b and 39c in the sub-scanning direction Y (see FIG. 4).

The light beam passed through the lower part of the other fθ lens 19 is first reflected upward by the reflective mirror 39a in the cyan optical unit 20C, and then reflected to the front side by the reflective mirror 39b. Thereafter, the light beam is reflected vertically downward by the reflective mirror 39c, passes vertically through the toroidal lens 40, and is then emitted from a cyan emission window 21C.

The black optical unit 20K is disposed in the rear most position in the front-to-rear direction, and comprises two reflective mirrors 41a and 41b for reflecting the light beam passed through the upper part of the other lens fθ 19, and a toroidal lens 42 for converging the light beam reflected by the reflective mirror 41a and 41b in the sub-scanning direction Y (see FIG. 4).

The light beam passed through the upper part of the other fθ lens 19 is first reflected obliquely in an upper front direction by the reflective mirror 41a in the black optical unit 20K, and then reflected vertically downward by the reflective mirror 41b. Thereafter, the light beam vertically passes through the toroidal lens 42, and is then emitted from a black emission window 21K.

Note that the magenta optical unit 20M and the cyan optical unit 20C are arranged symmetrically about the polygon mirror 17, and the yellow optical unit 20Y and the black optical unit 20K are positioned outside the magenta optical unit 20M and the cyan optical unit 20C symmetrically about the polygon mirror 17.

Moreover, as shown in FIG. 3, the scanner unit 12 comprises four BD sensors 75 as scan position detecting means for detecting the respective light beams. In the scanner casing 16, each of the BD sensors 75 is disposed at a position on one end of the scannable area S of the corresponding light beam, which is within an area excluding an area corresponding to the image forming area G and capable of detecting the light beam passed through the fθ lens 19. Based on the timings in which the light beams are detected by the respective BD sensors 75, the timings of forming toner images in the respective colors in the later-described processing units 13 are synchronized.

<Structure of Processing Unit>

As shown in FIG. 1, a plurality of processing units 13 are provided corresponding to toners in a plurality of colors. In other words, the processing units 13 include four yellow processing unit 13Y, magenta processing unit 13M, cyan processing unit 13C and black processing unit 13K. These processing units 13 are aligned sequentially from the front to rear side with a space therebetween to overlap in a horizontal direction.

Each of the processing units 13 comprises a photoconductor drum 51 as a photoconductor, a scorotron charger 52, and a development cartridge 53.

The photoconductor drum 51 is in a cylindrical form, and comprises a drum body whose outermost layer is formed by a positive-charge-type photosensitive layer made from polycarbonate or the like, and a drum shaft extending along the axial direction of the drum body at the axial center of the drum body. The drum body is rotatably mounted on the drum shaft, and the drum shaft is supported by both side walls in the width direction of the processing unit 13 (the direction crossing the front-to rear direction and the top-to-bottom direction at right angles, the same is also said for the following description) so that it is not rotatable. The drum body is designed so that the width in the main scanning direction is slightly larger than the width of A4 size paper. The photoconductor drum 51 is driven to rotate in the same direction (clockwise in FIG. 1) as the moving direction of a later-described transport belt 61 at the contact position with the transport belt 61 when forming an image.

The scorotron charger 52 is a positive-charge-type scorotron charger comprising a wire and a grid for producing a corona discharge by applying a charging bias, and is disposed on the rear side of the photoconductor drum 51 to face the photoconductor drum 51 with a space therebetween so that it is not in contact with the photoconductor drum 51.

The development cartridge 53 comprises a development roller 56, a supply roller 57, and a layer thickness control blade 58 in its body.

The development roller 56 is disposed in front of the photoconductor drum 51 to face the photoconductor drum 51, and is pressed against the photoconductor drum 51. The development roller 56 comprises a metal roller shaft covered with a roller part made of an elastic member such as a conductive rubber material. More specifically, the roller part is formed in a two-layer structure including a roller layer made of an elastic material such as a conductive urethane rubber, silicone rubber or EPDM rubber containing carbon fine particles, and a coat layer composed mainly of a urethane rubber, urethane resin, polyimide resin, etc., and covering the surface of the roller layer. The roller shaft of the development roller 56 is rotatably supported by both side walls in the width direction of the processing unit 13, and a development bias is applied when forming an image.

The supply roller 57 is disposed in front of the development roller 56 to face the development roller 56, and is pressed against the development roller 56. The supply roller 57 comprises a metal roller shaft covered with a roller part made of a conductive sponge member. The roller shaft of the supply roller 57 is rotatably supported by both side walls in the width direction of the processing unit 13.

The layer thickness control blade 58 is made of a metallic plate spring material, and has on its tip a pressing member having a semicircular cross section and made of an insulating silicone rubber. The layer thickness control blade 58 is supported above the development roller 56 by the body of the development cartridge 53, and the pressing member on its tip (lower end) is pressed from an upper front direction against the development roller 56.

The upper part of the body of the development cartridge 53 is formed as a toner holding chamber 55 for holding toner, and toner of each color is stored. Specifically, a positive-charge-type non-magnetic one-component polymerized toner in yellow color is held in the toner holding chamber 55 of the yellow processing unit 13Y. A positive-charge-type non-magnetic one-component polymerized toner in magenta color is held in the toner holding chamber 55 of the magenta processing unit 13M. A positive-charge-type non-magnetic one-component polymerized toner in cyan color is held in the toner holding chamber 55 of the cyan processing unit 13C. A positive-charge-type non-magnetic one-component polymerized toner in black color is held in the toner holding chamber 55 of the black processing unit 13K.

More specifically, for the toner in each color, substantially spherical polymerized toner obtained by a polymerization method is used. The polymerized toner is produced by using, as a main component, a binding resin obtained by copolymerizing styrene-based monomer such as styrene and acryl-based monomer such as acrylic acid, alkyl (C1-C4) acrylate, alkyl (C1-C4) methacrylate by a known polymerization method such as suspension polymerization, mixing a coloring agent, charge control agent, wax, etc. with the binding resin to form toner mother particles, and further adding an addition agent to the toner mother particles to improve the fluidity.

As the coloring agents, coloring agents in the above-described yellow, magenta, cyan and black are mixed. Further, as the charge control agent, for example, a charge control resin obtained by copolymerizing an ionic monomer having an ionic functional group such as an ammonium salt and a monomer copolymerizable with the ionic monomer, such as a styrene-based monomer and acryl-based monomer, is mixed. As the addition agent, for example, a powder of metal oxide, such as silica, aluminum oxide, titanium oxide, strontium titanate, cerium oxide and magnesium oxide, or an inorganic powder, such as a powder of carbide and a powder of metallic salt, is mixed.

In each of the processing units 13, when forming an image, the toner in each color held in each of the toner holding chambers 55 is supplied to the supply roller 57 and supplied to the development roller 56 with a rotation of the supply roller 57. At this time, the toner is frictionally charged positive between the supply roller 57 and the development roller 56 to which the development bias is applied. The toner supplied on the development roller 56 moves into the space between the layer thickness control blade 58 and the development roller 56 with a rotation of the development roller 56, and is carried as a thin layer with a constant thickness on the development roller 56.

Meanwhile, the scorotron charger 52 produces a corona discharge by the application of the charging bias, and uniformly charges the surface of the photoconductor drum 51 positive. After the surface of the photoconductor drum 51 is uniformly charged positive by the scorotron charger 52 with a rotation of the photoconductor drum 51, it is exposed to high-speed scan of the light beam emitted from the emission window 21 of the scanner unit 12, and thus an electrostatic latent image in each color corresponding to an image to be formed on the paper 3 is formed on the surface of the photoconductor drum 51.

Further, the photoconductor drum 51 is rotated, and then the toner carried on the surface of the development roller 56 and charged positive is supplied to the electrostatic latent image formed on the surface of the photoconductor drum 51, that is, the exposed portion where the electric potential is decreased by the exposure to the light beam in the surface of the photoconductor drum 51 uniformly charged positive, when the toner faces and comes into contact with the photoconductor drum 51 with a rotation of the development roller 56. Consequently, the electrostatic latent image on the photoconductor drum 51 is visualized, and the toner image formed by reverse development corresponding to each color is carried on the surface of the photoconductor drum 51.

<Structure of Transfer Unit>

The transfer unit 14 is disposed along the front-to-rear direction in the main casing 2 at a position above the paper cassette 7 and under the processing unit 13. The transfer unit 14 comprises a driving roller 59, a driven roller 60, a transport belt 61, transfer rollers 62, and a belt cleaning unit 63.

The driving roller 59 is disposed on the lower rear side of the photoconductor drum 51 of the black processing unit 13K. The driving roller 59 is driven to rotate in the reverse direction (counterclockwise in FIG. 1) to the rotating direction of the photoconductor drum 51 when forming an image.

The driven roller 60 is disposed on the lower front side of the photoconductor drum 51 of the yellow processing unit 13Y in the front-to-rear direction to face the driving roller 59. The driven roller 60 is rotated in the same direction (counterclockwise in FIG. 1) as the rotating direction of the driving roller 59 when the driving roller 59 is driven to rotate.

The transport belt 61 is composed of an endless belt, and formed by a resin such as conductive polycarbonate or polyimide in which conductive particles such as carbon are dispersed. The transport belt 61 is wound between the driving roller 59 and the driven roller 60, and arranged so that the outer contact surface of the wound transport belt 61 faces and is in contact with all the photoconductor drums 51 of the respective processing units 13.

With the driving of the driving roller 59, the driven roller 60 is driven, and the transport belt 61 is moved round in a direction shown by arrow A (counterclockwise in FIG. 1) between the driving roller 59 and the driven roller 60 so that it rotates in the same direction as the photoconductor drum 51 on the contact surface facing and in contact with the photoconductor drums 51 of the respective processing units 13.

The transfer rollers 62 are disposed inside the transport belt 61 wound between the driving roller 59 and the driven roller 60 so that they face the photoconductor drums 51 of the respective processing units 13 with the transport belt 61 therebetween. Each of the transfer rollers 62 comprises a metal roller shaft covered with a roller part made of an elastic member such as a conductive rubber material. The roller shaft of the transfer roller 62 extends along the width direction and is rotatably supported, and a transfer bias is applied to the transfer roller 62 during a transfer. Each transfer roller 62 rotates in the same direction (counterclockwise in FIG. 1) as the moving direction of the transport belt 61 on the contact surface facing and in contact with the transport belt 61.

Then, the paper 3 fed from the paper feed unit 4 is transported to pass through the image forming positions between the transport belt 61 and the photoconductor drums 51 of the respective processing units 13 one after the other from the front toward the rear side by the transport belt 61 that is moved by the driving of the driving roller 59 and the following movement of the driven roller 60. During the transport, the toner images corresponding to the respective colors carried on the photoconductor drums 51 of the respective processing units 13 are transferred one after the other, and consequently, a color image is formed on the paper 3.

In other words, for example, when the yellow toner image carried on the surface of the photoconductor drum 51 of the yellow processing unit 13Y is transferred to the paper 3, then the magenta toner image carried on the surface of the photoconductor drum 51 of the magenta processing unit 13M is transferred in a superimposed manner to the paper 3 on which the yellow toner image has already been transferred. Similarly, the cyan toner image carried on the surface of the photoconductor drum 51 of the cyan processing unit 13C and the black toner image carried on the surface of the photoconductor drum 51 of the black processing unit 13K are transferred in a superimposed manner, and consequently a color image is formed on the paper 3.

When forming such a color image, the color laser printer 1 can form toner images corresponding to the respective colors at substantially the same speed as a speed of forming a monochrome image because it has a tandem type apparatus structure in which a plurality of processing units 13 are provided corresponding to the respective colors, thereby achieving quick color image formation. It is thus possible to form a color image while achieving a reduction in the size.

The belt cleaning unit 63 is disposed under the transport belt 61 to face the black processing unit 13K with the transport belt 61 therebetween.

The belt cleaning unit 63 is arranged in contact with the surface of the transport belt 61, and comprises a primary cleaning roller 64 for scraping off the paper powder and toner adhering to the surface of the transport belt 61, a secondary cleaning roller 65 disposed in contact with the primary cleaning roller 64 to electrically collect the paper powder and toner scraped off by the primary cleaning roller 64, a scraping blade 66 that comes into contact with the secondary cleaning roller 65 and scrapes off the paper powder and toner collected on the secondary cleaning roller 65, and a cleaning box 67 for storing the paper powder and toner scraped off by the scraping blade 66.

In the belt cleaning unit 63, the paper powder and toner adhering to the surface of the transport belt 61 are first scraped off by the primary cleaning roller 64, and then the paper powder and toner scraped off by the primary cleaning roller 64 are electrically collected by the secondary cleaning roller 65. Next, after the paper powder and toner collected by the secondary cleaning roller 65 are scraped off by the scraping blade 66, they are stored in the cleaning box 67.

<Structure of Fixing Unit>

The fixing unit 15 is disposed on the rear side of the transfer unit 14. The fixing unit 15 comprises a heat roller 68, a pressure roller 69, and transport rollers 70. The heat roller 68 is composed of a metal pipe with a surface on which a mold release layer is formed, and incorporates a halogen lamp along the axial direction. The surface of the heat roller 68 is heated to a fixing temperature by the halogen lamp. The pressure roller 69 is mounted to press the heat roller 68. The transport rollers 70 include a pair of upper and lower rollers, and are disposed on the rear side of the heat roller 68 and the pressure roller 69.

The color image transferred onto the paper 3 is then transported to the fixing unit 15, and thermally fixed to the paper 3 by heat and pressure while the paper 3 is passing between the heat roller 68 and the pressure roller 69. The thermally fixed paper 3 is transported to the paper discharge unit 6 by the transport rollers 70.

<Structure of Paper Discharge Unit>

The paper discharge unit 6 comprises a paper discharge path 71, a paper discharge roller 72, and a paper discharge tray 73.

The paper discharge path 71 is formed as a substantially U-shaped transport path for paper 3 so that the upstream-side end is adjacent to the transport rollers 70 in the lower part to transport the paper 3 toward the rear side and the downstream end is adjacent to the paper discharge rollers 72 in the upper part to discharge the paper 3 toward the front side.

The paper discharge rollers 72 are provided as a pair of rollers on the downstream-side end of the paper discharge path 71.

The paper discharge tray 73 is formed on the upper surface of the main casing 2 as an inclined wall inclining downward from the front to rear side.

The paper 3 fed from the transport rollers 70 is reversed in the transport direction in the paper discharge path 71, and then discharged toward the front side by the paper discharge rollers 72. The discharged paper 3 is placed on the paper discharge tray 73.

As described above, in the scanner unit 12 of the color laser printer 1, the light beams from the four light beam emitting units 24 are incident on the reflective surfaces 17a of the polygon mirror 17 from directions that cross the center line L1 in the main scanning direction X of the image forming area G that is scanned by the respective light beams and are point symmetrical to each other with respect to the rotation axis 23 of the polygon mirror 17. Therefore, even when the number of the reflective surfaces 17*a* of the polygon mirror 17 is six, it is possible to avoid a scan deviation in the sub-scanning direction Y of the respective light beams. Moreover, since two fθ lenses 19 are positioned so that their lens center positions C are displaced in mutually opposite directions from the center line L1 in the main scanning direction X of the image forming area G, it is possible to cause each set of light beams scanned by the polygon mirror 17 to pass through the vicinity of the lens center positions C of the respective fθ lenses 19. It is thus possible to surely form high-quality electrostatic latent images on the respective photoconductor drums 51. As a result, a high-quality color image can be formed on the paper 3.

Further, since each of the fθ lenses 19 is positioned so that the lens center position faces the center position in the main scanning direction X of the scannable area S in a direction parallel to the center line L1 in the main scanning direction X of the image forming area G, it is possible to cause each light beam scanned by the polygon mirror 17 to more surely pass through the vicinity of the lens center position C of each fθ lens 19. It is thus possible to surely form a high-quality electrostatic latent image on each of the photoconductor drums 51.

Moreover, since symmetrical lenses are employed as the fθ lenses 19, it is possible to construct the fθ lenses 19 at low cost. It is thus possible to achieve a reduction in the cost of the apparatus.

Further, a lens having a width printable on A3 size paper (the width in the main scanning direction X), that is, a lens for A3 capable of providing a fθ function in an area corresponding to the width of A3 size paper, is used as the fθ lens 19, and the fθ lens 19 is arranged so that the lens center position C faces the center position in the main scanning direction X of the scannable area S in a direction parallel to the center line L1 in the main scanning direction X of the image forming area G. It is therefore possible to certainly prevent the light beam from passing through an edge of the fθ lens 19 where the optical characteristic is poor. Consequently, it is possible to more certainly form a high-quality electrostatic latent image on each photoconductor drum 51 without degrading the quality of the electrostatic latent image formed on each photoconductor drum 51.

Besides, since the polygon mirror 17 has six reflective surfaces 17*a* and the number of the surfaces is an even number, it is possible to accurately synchronize the incident timings of the respective sets of light beams on mutually different reflective surfaces 17*a*, thereby certainly avoiding a scan deviation in the sub-scanning direction Y of the respective light beams.

Further, since the number of the reflective surfaces 17*a* of the polygon mirror 17 is six, in comparison with the structure employing a polygon mirror having four reflective surfaces, it is possible to achieve high-speed scanning of light beams even when the rotation speed of the polygon mirror 17 is the same. It is therefore possible to certainly avoid troubles such as a scan deviation in the sub-scanning direction Y of the respective light beams while achieving high-speed scanning of light beams.

In addition, since the BD sensors 75 are disposed in an area within the scannable area S and excluding the image forming area G, it is possible to certainly detect a light beam with each BD sensor 75 while preventing interference of scanning of the image forming area G by the light beams.

Besides, since the light beam after passing through the fθ lens 19 is detected by each BD sensor 75, it is possible to accurately detect the timing of scanning the image forming area G by each light beam. As a result, a higher quality electrostatic latent image can be formed on each photoconductor drum 51.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A scanner apparatus for scanning an image forming area with a light beam, comprising:
   a polygon minor with a plurality of reflective surfaces for directing a light beam reflected thereby to the image forming area, and scanning the light beam in a scannable area wider than the image forming area in a main scanning direction by rotating on its rotation axis;
   a plurality of light beam emitting units for emitting light beams to the reflective surfaces from directions that cross a center line in the main scanning direction of the image forming area and are point symmetrical to each other with respect to the rotation axis of said polygon minor; and
   a plurality of fθ lenses for scanning the light beams at equal speed in the image forming area, said fθ lenses being disposed so that their lens center positions through which the light beams directed to a center position in the main scanning direction of the scannable area pass are displaced in mutually opposite directions from and equidistant from the center line in the main scanning direction of the image forming area,
   wherein the image forming area is set so that the center line in the main scanning direction of the image forming area passes through the rotation axis of said polygon mirror.

2. The scanner apparatus according to claim 1, wherein each of the fθ lenses is a symmetrical lens having a symmetrical shape about the lens center position.

3. The scanner apparatus according to claim 1, wherein said polygon mirror has an even number of the reflective surfaces.

4. The scanner apparatus according to claim 3, wherein said polygon mirror has six or more reflective surfaces.

5. The scanner apparatus according to claim 1, further comprising a scan position detecting unit, disposed in an area within the scannable area and excluding the image forming area, for detecting the light beam.

6. The scanner apparatus according to claim 5, wherein said scan position detecting unit detects the light beam after passing through the fθ lens.

7. The scanner apparatus according to claim 1, wherein each of said fθ lenses is disposed so that the lens center position faces the center position in the main scanning direction of the scannable area in a direction parallel to the center line in the main scanning direction of the image forming area.

8. An image forming apparatus comprising:
a plurality of photoconductors; and a scanner apparatus for scanning an image forming area with a light beam, wherein said scanner apparatus comprises: a polygon mirror with a plurality of reflective surfaces for directing a light beam reflected thereby to the image forming area, and scanning the light beam in a scannable area wider than the image forming area in a main scanning direction by rotating on its rotation axis;
a plurality of light beam emitting units for emitting light beams to the reflective surfaces from directions that cross a center line in the main scanning direction of the image forming area and are point symmetrical to each other with respect to the rotation axis of said polygon mirror; and
a plurality of fθ lenses for scanning the light beams at equal speed in the image forming area, said fθ lenses being disposed so that their lens center positions through which the light beams directed to a center position in the main scanning direction of the scannable area pass are displaced in mutually opposite directions from and equidistant from the center line in the main scanning direction of the image forming area,
wherein the image forming area is set so that the center line in the main scanning direction of the image forming area passes through the rotation axis of said polygon mirror.

9. The scanning apparatus according to claim 1, wherein each of said plurality of fθ lenses is disposed, so that its lens center position is coincident with the center position of the scannable area.

10. The scanning apparatus according to claim 1, wherein each of said plurality of fθ lenses is disposed equidistant from the center line in the main scanning direction of the image forming area.

11. The image forming apparatus according to claim 8, wherein each of the fθ lenses is a symmetrical lens having a symmetrical shape about the lens center position.

12. The image forming apparatus according to claim 8, wherein said polygon mirror has an even number of the reflective surfaces.

13. The image forming apparatus according to claim 12, wherein said polygon mirror has six or more reflective surfaces.

14. The image forming apparatus according to claim 8, further comprising a scan position detecting unit, disposed in an area within the scannable area and excluding the image forming area, for detecting the light beam.

15. The image forming apparatus according to claim 14, wherein said scan position detecting unit detects the light beam after passing though the fθ lens.

16. The image forming apparatus according to claim 8, wherein each of said fθ lenses is disposed so that the lens center position faces the center position in the main scanning direction of the scannable area in a direction parallel to the center line in the main scanning direction of the image forming area.

17. The image forming apparatus according to claim 8, wherein each of said plurality of fθ lenses is disposed, so that its lens center position is coincident with the center position of the scannable area.

18. The image forming apparatus according to claim 8, wherein each of said plurality of fθ lenses is disposed equidistant from the center line in the main scanning direction of the image forming area.

* * * * *